United States Patent
Stevens et al.

(10) Patent No.: US 8,048,459 B2
(45) Date of Patent: *Nov. 1, 2011

(54) EXTERNAL COATING COMPOSITION FOR TOASTER PASTRIES AND OTHER PASTRY PRODUCTS

(75) Inventors: Cheree L. B. Stevens, Idaho Falls, ID (US); Robert O. Roskam, Grand Rapids, MI (US)

(73) Assignee: Advanced Food Technologies, Inc., Grand Rapids, MI (US)

( * ) Notice: Subject to any disclaimer, the term of this patent is extended or adjusted under 35 U.S.C. 154(b) by 158 days.

This patent is subject to a terminal disclaimer.

(21) Appl. No.: 10/629,991

(22) Filed: Jul. 30, 2003

(65) Prior Publication Data

US 2004/0071832 A1 Apr. 15, 2004

Related U.S. Application Data

(60) Provisional application No. 60/417,295, filed on Oct. 9, 2002.

(51) Int. Cl.
 *A23D 13/08* (2006.01)
(52) U.S. Cl. .................. 426/94; 426/103; 426/556
(58) Field of Classification Search .......... 426/68, 426/89, 94, 103, 302
 See application file for complete search history.

(56) References Cited

U.S. PATENT DOCUMENTS

| | | | |
|---|---|---|---|
| 2,341,523 A * | 2/1944 | Bauer ............... 106/205.71 |
| 3,424,591 A | 1/1969 | Gold |
| 3,597,227 A | 8/1971 | Murray et al. |
| 3,723,132 A * | 3/1973 | Hodge et al. ........... 426/551 |
| 3,751,268 A | 8/1973 | Van Patten et al. |
| 3,773,521 A * | 11/1973 | Tsen et al. ................. 426/24 |
| 4,053,650 A | 10/1977 | Chino et al. |
| 4,504,502 A * | 3/1985 | Earle et al. .............. 426/293 |
| 4,504,509 A | 3/1985 | Bell et al. |
| 4,510,166 A * | 4/1985 | Lenchin et al. ......... 426/565 |
| 4,520,034 A | 5/1985 | Ishii et al. |
| 4,551,340 A | 11/1985 | El-Hag et al. |
| 4,623,542 A * | 11/1986 | Wallin et al. ............... 426/94 |
| 4,710,228 A | 12/1987 | Seaborne et al. |
| 4,790,997 A | 12/1988 | Friedman et al. |
| 4,792,458 A | 12/1988 | Friedman et al. |
| 4,828,847 A | 5/1989 | Thompson |
| 5,004,616 A | 4/1991 | Shanbhag et al. |
| 5,035,912 A | 7/1991 | Furcsik et al. |
| 5,059,435 A | 10/1991 | Sloan et al. |
| 5,120,562 A | 6/1992 | Furcsik et al. |
| 5,141,759 A | 8/1992 | Sloan et al. |

(Continued)

FOREIGN PATENT DOCUMENTS

CA 2101474 7/1993

(Continued)

OTHER PUBLICATIONS

LrdRas, Flour as Thickener, Sep. 4 and 5, 1998. http://www.florilegium.org/files/FOOD-BREADS/flour-msg.html.*

(Continued)

*Primary Examiner* — Kelly Bekker

(74) *Attorney, Agent, or Firm* — Price Heneveld LLP

(57) ABSTRACT

A toaster pastry at least partially coated with a clear coating that provides an at least partial moisture barrier on the surface of the toaster pastry.

31 Claims, 1 Drawing Sheet

U.S. PATENT DOCUMENTS

| | | | |
|---|---|---|---|
| 5,204,137 A | 4/1993 | Slimak | |
| 5,260,076 A | 11/1993 | Furcsik et al. | |
| 5,302,410 A | 4/1994 | Calder et al. | |
| 5,393,552 A | 2/1995 | Busacker et al. | |
| 5,431,944 A | 7/1995 | Melvej | |
| 5,439,697 A * | 8/1995 | Gonzalez-Sanz | 426/572 |
| 5,484,617 A | 1/1996 | Tiffany | |
| 5,492,707 A | 2/1996 | Chalupa et al. | |
| 5,622,741 A | 4/1997 | Stubbs et al. | |
| 5,626,893 A | 5/1997 | Reddy | |
| 5,648,110 A | 7/1997 | Wu et al. | |
| 5,750,168 A | 5/1998 | Woerman et al. | |
| 5,753,286 A | 5/1998 | Higgins | |
| 5,849,351 A | 12/1998 | Higgins et al. | |
| 5,885,639 A | 3/1999 | Judkins et al. | |
| 5,897,898 A | 4/1999 | Rogols et al. | |
| 5,922,392 A | 7/1999 | Kelly et al. | |
| 5,928,693 A | 7/1999 | Friedman et al. | |
| 5,965,189 A | 10/1999 | Stevens et al. | |
| 5,976,607 A | 11/1999 | Higgins et al. | |
| 5,988,048 A | 11/1999 | Hunter et al. | |
| 5,997,918 A | 12/1999 | Melvej | |
| 6,022,569 A | 2/2000 | Rogols et al. | |
| 6,080,434 A | 6/2000 | Horn et al. | |
| 6,086,928 A | 7/2000 | Stevens et al. | |
| 6,113,957 A | 9/2000 | Mattinson et al. | |
| 6,132,785 A | 10/2000 | Collinge et al. | |
| 6,159,521 A | 12/2000 | Horn et al. | |
| 6,197,363 B1 | 3/2001 | Walter, Jr. et al. | |
| 6,217,921 B1 | 4/2001 | Lanner et al. | |
| 6,265,005 B1 | 7/2001 | Haverkos et al. | |
| 6,288,179 B1 | 9/2001 | Baur et al. | |
| 6,635,294 B2 | 10/2003 | Keijbets | |
| 6,733,809 B2 | 5/2004 | Zimmerman et al. | |
| 2002/0058099 A1 | 5/2002 | Stevens | |
| 2002/0119219 A1 | 8/2002 | Doyle et al. | |
| 2003/0044488 A1 | 3/2003 | Roskam et al. | |
| 2004/0028784 A1 * | 2/2004 | Van Beirendonck | 426/273 |

FOREIGN PATENT DOCUMENTS

| | | |
|---|---|---|
| EP | 0547551 A1 * | 6/1993 |
| WO | 8501188 | 3/1985 |
| WO | 9421143 | 9/1994 |
| WO | 9600011 | 1/1996 |
| WO | 9742827 | 11/1997 |
| WO | 9746106 | 12/1997 |
| WO | 0065932 | 11/2000 |
| WO | 0069287 | 11/2000 |
| WO | 0156393 | 8/2001 |

OTHER PUBLICATIONS

LrdRas, Flour as Thickener, Sep. 4 and 5, 1998. http://www.florilegium.org/files/FOOD-BREADS/flour-msg.html pp. 1-2. Made public Mar. 20, 2001 as evidence by webarchive.org (1 page).*

Fennema, Owen (ed.), Food Chemistry Third Edition, Marcel Dekker, Inc. 1996. p. 201.*

Fennema, Owen (ed), Food Chemistry Third Edition, Marcel Dekker Inc, 1996. pp. 202-204.*

Food Product Design: Applications—"Keeping the Crunch in Breakfast Cereals" Jun. 2001.

Capolex B; Specialty Coatings for Snack Foods & Baked Goods, Centerchem, Inc., Jul. 1999.

84th AACC Annual Meeting Symposia and Reports, A. Jurgens, J.M. Maagd, and A.J. ten Dam, Oct. 31-Nov. 3, 1999.

Specialty-Corn Types, David V. Glover, Dept. of Agronomy, Purdue University, Oct. 1999.

Prior Art Batter Formula.

* cited by examiner

EXTERNAL COATING COMPOSITION FOR TOASTER PASTRIES AND OTHER PASTRY PRODUCTS

CROSS-REFERENCE TO RELATED APPLICATIONS

This application claims the benefit of U.S. Provisional Patent Application No. 60/417,295, filed Oct. 9, 2002, the disclosure of which is hereby incorporated by reference in its entirety.

BACKGROUND OF THE INVENTION

This invention relates to a clear coating moisture barrier composition applied to the external surface of toaster pastries.

Numerous different types of edible food coatings are known. These include relatively heavy and thick coatings of various materials (e.g., bread crumbs, potato batter, tempura, etc.) as well as various flour or starch-based coatings that are usually applied as a relatively thin batter thereby forming a much thinner coating, which can be substantially transparent after application to the food substrate. The thinner coatings are then cooked, further cooked if parfried, or otherwise thermally processed. This latter type of coating is extensively used on commercially prepared french fry potatoes, where they are often referred to as "clear coats" due to their unobtrusive and, in some cases, virtually unnoticeable visual characteristic. Clear coats formulated for french fry products would not typically adhere to wheat based substrates, such as pastry or dough. In addition to coating french fry potatoes, it has been known to use "clear coats" on snack foods and convenience foods. These clear coat compositions generally improve taste, appearance, and crispness of the exterior of the coated food and increase palatability for the food substrate.

It is also known to use clear glazes on baked goods. The glazes may be applied either before or after baking. The sole purpose of these glazes is to impart shine, but they tend to become wet and sticky over time. Still other glazes have been used to impart softness to the surface of a baked good. Such glazes typically comprise ingredients such as sugar, corn syrup solids, maltodextrins, egg, and milk.

Applicants believe that toaster pastries under the brand name Pop-Tarts® by Kellogg's Company of Battle Creek, Mich., and others have been on the market since about 1964. Since that time, several problems have been associated with toaster pastries. Despite sometimes elaborate and expensive packaging, uncoated toaster pastries of the past may become dry and not fresh tasting soon after production. Conventional, uncoated toaster pastries also become drier and even less fresh tasting upon reheating. Upon placing the toaster pastry in the presence of a known food-heating device, namely a toaster, toaster oven, or the like, the little amount of moisture on the interior of the toaster pastry is lost and the exterior of the toaster pastry becomes dry and crumbly. This results in a pastry product, which is intended to be conveniently unpackaged, quickly heated, and consumed, but instead is drier and more crumbly than a fresh-baked pastry product.

Accordingly, there is a significant need for an inexpensive, easily produced, pastry product having an enhanced mouth feel and taste due.

SUMMARY OF THE INVENTION

The present invention comprises a pastry product, and methods of making the same, at least partially coated with a substantially clear coating composition that includes a starch component, such that the clear coating composition provides at least a partial moisture barrier on the pastry product.

The present invention goes well beyond prior art technology in both the nature and use of thin, edible food coatings by providing coating formulations and application procedures that enable the coatings to be applied either before or after the thermal processing (i.e., frying, baking, toasting, or otherwise cooking or pre-cooking) of the dough-based toaster pastry. Thin, edible food coatings of the present invention produce a light, crispy exterior coating on a pastry product while maintaining a moist interior even upon reheating. Coating the toaster pastry with the coatings of the present invention and thereafter heating the toaster pastry produces a highly desirable moisture barrier feature on the coated toaster pastry that greatly extends its useable shelf life and significantly improves the mouth feel and texture of the pastry product. A clear-coat, moisture barrier, coated toaster pastry of the present invention has a crisp outer exterior and moist flavorful interior even upon reheating.

These and other features, advantages, and objects of the present invention will be further understood and appreciated by those skilled in the art by reference to the following specification, claims, and appended drawings.

DETAILED DESCRIPTION OF PREFERRED EMBODIMENT

Figure 1:
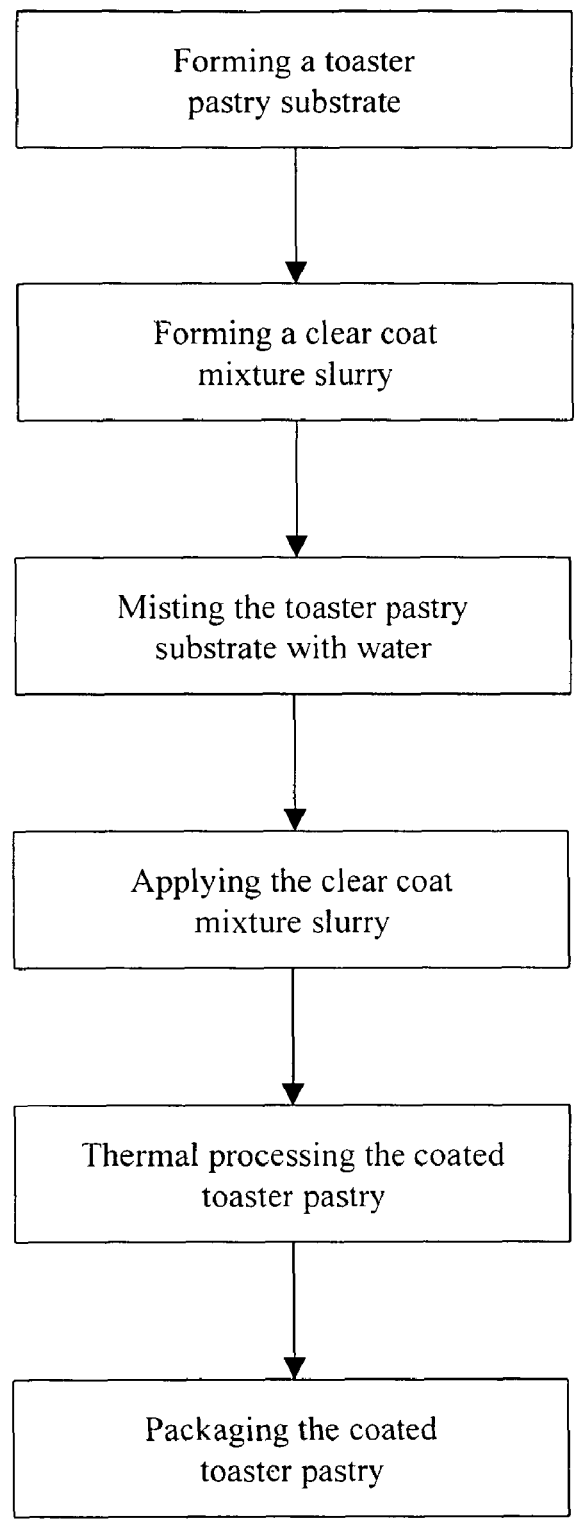
FIG. 1 is a flow chart depicting the process of applying the moisture barrier clear coat composition to a toaster pastry according to the present invention.

Pastries are typically made from low protein wheat flours or incorporating low-protein wheat flours. Flours having less than 11% protein are considered in the industry to be "low protein flours." Also a mix of flours having a range of protein contents is considered in the industry to be a low protein flour if the average protein content of the mixture is less than 11%.

Pastries may be unfilled or filled. Filled pastries may have an open filling, where the filling is visible, or may enclose the filling, such that the filling is entirely within the pastry. When coating a pastry with an open filling, the coating would not typically be used on the filling portion. Further, the moisture content of the pastry dough used may vary. The coatings of the present invention are preferably used on pastries having a low moisture content dough. The term "low moisture content dough" as used herein refers to the finished product moisture content of the dough. A low moisture content dough refers to a dough whose finished product moisture content is less than 12%, preferably less than 10%, and most typically between about 5% and about 8%.

The coatings of the present invention are especially useful on toaster pastries. Toaster pastries typically include any pastry product that a consumer may purchase and optionally reheat prior to ingesting. Typically, the toaster pastry will be reheated in a toaster, toaster oven, microwave, or other food heating appliance or apparatus. Examples of toaster pastries include, but are not limited to, the following: Pop-Tarts®; Pop-Tarts Pastry Swirls®; Pop-Tarts Minis®; Pop-Tarts Snak-Stix®, all of which are produced by the Kellogg Company. Other examples include: Toaster Bites® produced by the Brownie Products Company; Toaster Breaks® produced by Chef America, Inc.; Toaster Scrambles® produced by The Pillsbury Company; Toaster Strudel® produced by The Pillsbury Company; and Toaster Treats® produced by The Kroger Company, or the like.

In the preferred embodiment, a toaster pastry product is at least partially coated with a clear coating composition having a starch component, a film-forming agent, and optionally, a leavening system, a sweetener, and a stabilizer. Subsequently, the toaster pastry product is thermally processed, thereby forming a moisture barrier on the pastry product.

Typically, the clear coat moisture barrier for toaster pastries includes the following ingredients:

| Ingredient | Range (%/W) |
|---|---|
| starch component | 20-100 |
| sodium acid pyrophosphate 28 (leavening agent) | 0-5 |
| sodium bicarbonate #2 (leavening agent) | 0-5 |
| corn dextrin | 5-75 |
| sugar (sweetening agent) | 0-30 |
| xanthan gum (stabilizer) | 0-3 |

The starch is typically present in the clear coat moisture barrier from about 20% to about 100%; more typically from about 40% to about 60%, and most typically at about 50.81%.

The clear coat moisture barrier of the present invention is typically applied as a slurry. The clear coat moisture barrier slurry of the present invention may be applied to the raw toaster pastry dough when in a pre-thermal state, or applied to the processed and formed toaster pastry. Typically, the toaster pastries are cooked somewhat or otherwise heated during their processing at a toaster pastry production plant.

Due to the enhanced strength provided by the clear coat barrier, toaster pastry products coated with a clear coat moisture barrier of the present invention exhibit less breakage upon shipping and handling. The clear coat moisture barrier imparts a tensile strength to the finished toaster pastry products. The moisture barrier coating also results in a coating that is typically invisible to the consumer and thus will not detract from the appearance of the toaster pastry product to which it is applied. Optionally, a colorant could be added, but is usually not desired and, therefore, is not typically included in the formula. However, if one were to use a colorant, possible colorants include caramel (bakery goods primarily), or any water dispersible food colorant or combination of food colorants.

The starch component preferably is a wheat starch, or a starch combination that includes a wheat starch. Most preferably, the starch component is a wheat starch substantially free of other types of starches.

Wheat starch is used to provide viscosity, crispness and film formation. The wheat starch also generally increases the adhesion of the clear coat to the toaster pastry. Such a wheat starch may be a modified wheat starch such as an oxidized and substituted wheat starch. Typically, the wheat starch used in the moisture barrier coating for toaster pastries has been modified. The modified wheat starch is typically an oxidized and substituted wheat starch that typically ranges from about 0.01% to about 1%; however, the more typical substitution level is about 0.1%. One modified wheat starch that may be used in the clear coat moisture barrier of the present invention is Midsol™ 35, which can be purchased from Midwest Grain Products of Atchison, Kans.

Oxidation of the starch enhances adhesion and clarity of the starch coating. It also lowers viscosity, making it possible to use thinner coatings. The preferred substitution is acetylation. Acetylation gives the starch coating good clarity. It is often desirable that the coating be essentially invisible.

The clear coat moisture barrier also typically includes a dextrin. The dextrin utilized may include corn dextrin, tapioca dextrin, potato dextrin, etc.; however, corn dextrin is most typically used. The corn dextrin is believed to provide superior film forming functionality to the coating compositions as well as crispness and tensile strength. All dextrins are soluble to some degree, however, the use of a low solubility dextrin is preferred in the present invention. The term "low solubility dextrin" typically means less than 32% of the dextrin is soluble when placed in cold water (approximately 77° F.) and more typically about 15% soluble or less. is cold water. Typically, solubility of dextrin is measured by dissolving a weighed amount of dextrin in a given amount of water and then filtering out any insoluble material. The filtrate is then evaporated in a steam bath followed by a stay in a vacuum oven. The weight of the residue divided by the sample beginning weight times 100 gives the solubility percentage. Further, to one of ordinary skill in this art, the term "low solubility dextrin" also refers to the solubility of a dextrin when compared to other dextrins. For example, a medium solubility dextrin may exhibit from 32% to 90% solubility when placed in cold water (approximately 77° F.) and a high solubility dextrin may exhibit 90% or more solubility when placed in cold water (approximately 77° F.). The typical clear coat moisture barrier used to coat toaster pastries contains from about 5% to about 75%, more typically from about 20% to about 40%, and most typically at about 32% corn dextrin. While any corn dextrin may be used, one source of corn dextrin is C*DrySet 07702 corn dextrin available from Cargill of Minneapolis, Minn.

The clear coat moisture barrier may also typically contain a leavening system, usually a two-component, acid/base system. The leavening system typically utilizes an acid in combination with a bicarbonate salt. Typically, the sodium acid pyrophosphate (SAPP) or other acid is present in the range of from about 0% to about 5%, more typically from about 0.5% to about 2.5%, and most typically about 1.8%. The bicarbonate salt typically includes sodium bicarbonate #2 (U.S.P. fine granular) within the range of from about 0% to about 5%, more typically from about 0.5% to about 2.5%, and most typically at about 1.24%. Any sodium bicarbonate or SAPP may be used in the present invention. Church & Dwight Co. Inc. of Princeton, N.J. is one source of sodium bicarbonate that is useful in the present coating. A source of sodium acid pyrophosphate includes sodium acid pyrophosphate 28 (SAPP 28), available from Solutia, Inc. of Springfield, Mass. The sodium acid pyrophosphate, in combination with sodium bicarbonate #2, provides chemical leavening that result in a light tender texture and increases the crispness of the exterior of the toaster pastry.

The clear coat moisture barrier may also include sugar or other sweetening agent. The sugar is typically added as a solute to control starch hydration and film formation. In appropriate amounts, sugar imparts a sweet flavor, if desired. The sugar present in the clear coat moisture barrier typically is granular sugar as purchased from Bremer Sugar, of Zeeland, Mich. The sugar of the clear coat moisture barrier may be present from about 0% to about 30%, more typically from about 10% to about 20%, and most typically at about 14%.

Additionally, the clear coat moisture barrier may include gums or similar stabilizers, including, but not limited to, xanthan gum, guar gum, or CMC (carboxymethylcellulose). More typically, the clear coat moisture barrier includes a xanthan gum such as Keltrol F™ available from Kelco Co. of Wilmington, Del. The xanthan gum or other stabilizer may be present in the clear coat moisture barrier in the amount of from about 0% to about 3%, more typically from about 0.05% to about 1.0%, and most typically at about 0.15%.

A more typical pastry coating formula using the above ingredients has about 40% to about 60% wheat starch, from about 20% to about 40% dextrin, from about 0.5% to about 2.5% sodium acid pyrophosphate, from about 0.5% to about 2.5% sodium bicarbonate, from about 10% to about 20% granulated sugar, and from about 0% to about 3% stabilizer, where the clear coating forms a substantially clear, at least partial moisture barrier on the surface of the toaster pastry.

The clear coat moisture barrier of the present invention typically is in the physical form of a wet slurry. Typically, the slurry temperature of the wet slurry clear coat moisture barrier applied to the toaster pastry of the present invention is from about 40° F. to about 100° F., more typically from about 55° F. to about 85° F., and most typically at about 70° F. The slurry solids content percentage is typically from about 5.0% to about 70.0%, more typically from about 30.0% to about 55.0%, and most typically at about 46%. The slurry viscosity, measured in seconds, using the procedure outlined below, is typically about 8 seconds to about 40 seconds, more typically from about 10 seconds to about 20 seconds, and most typically at about 14 seconds. The slurry solids parameter is an indication of the percentage of the slurry in solid physical form. As the slurry solids percentage increases, the tensile strength of the clear coat moisture barrier increases. The slurry viscosity is typically measured by the industry Stein testing procedure outlined below:

1. Completely fill a clean, dry Stein cup with slurry (using a fingertip to act as a stopper to prevent the slurry from draining out the bottom of the cup hole);
2. Use other hand to hang onto the wire handle of the Stein cup and to hold the stopwatch;
3. Remove finger covering the bottom cup hole and simultaneously start stopwatch. Stop the watch when the slurry stream passing through the bottom cup hole first breaks the continuous stream;
4. Record the time in seconds; and
5. Repeat this procedure two additional times. Calculate the average of the three determinations and record.

The clear coat moisture barrier and wet slurry form may be applied to the toaster pastry by any industrially acceptable method, such as spray coating or a drip bath. However, the typical method of application of the clear coat moisture barrier wet slurry to the toaster pastry is using a waterfall/dip application, which typically coats the entire toaster pastry. A waterfall application is an application method where the wet slurry falls from a position above the toaster pastry onto the toaster pastry. The dip application method involves physically dipping the toaster pastry in the clear coat moisture barrier wet slurry. The waterfall method is typically used to coat the top surface of the pastry product while the dip method is used to coat the bottom surface, but, conceivably, either application method could be used independently as well. Using a combination of the dip and waterfall application method is typically used to speed processing.

The amount of wet slurry pickup is typically measured in all application methods. The wet slurry pickup measures the amount of clear coat moisture barrier wet slurry, which does not fall off or drip from the toaster pastry after application. The wet slurry pickup percentage is determined via the following calculation: the coated weight of the coated toaster pastry minus the uncoated weight of the uncoated toaster pastry divided by the uncoated weight times 100. Typically, the thinner (i.e., the lower the percentage of solids) clear coat moisture barrier wet slurry, the lower the wet slurry pickup. Conversely, the thicker (i.e., the greater the percentage of solids) clear coat moisture barrier wet slurry, the higher the slurry pickup. The moisture barrier clear coat composition of the present invention, when applied to a toaster pastry product, typically attains a percentage solids pickup of from about 5% to about 30%, more typically from about 8% to about 20%, and most typically at about 11% wet slurry pickup. The mass of wet slurry pickup may range from about 2 grams to about 17 grams, more typically from about 4 grams to about 11 grams, and most typically about 6 grams of wet slurry pickup.

Alternatively, either prior to or after the toaster pastry is processed at the production facility (i.e., microwaved, baked, fried, or toasted), water may optionally be applied to the toaster pastry surface. The water is typically applied as a fine mist and functions to reconstitute the surface of the toaster pastry. The damp surface of the toaster pastry enhances the wet slurry adhesion to the surface of the toaster pastry.

EXAMPLE 1

The following examples more precisely and particularly illustrates the specific details of the present invention. Equivalent procedures and quantities will occur to those skilled in the art and, therefore, the following examples are not meant to define the limits of the present invention, these being defined by the scope of the appended claims. The object of these examples was to prepare clear coat moisture barrier coated toaster pastries in a laboratory environment, wherein the clear coat on the toaster pastry was not visible but which provides a crisp outer exterior and preserves the moist flavorful interior of the toaster pastry. The ingredients utilized in the moisture barrier in this example include:

| Formula 1 | |
| --- | --- |
| Ingredient | % Formula |
| Midsol 35 ™ (modified wheat starch component) | 50.81 |
| sodium acid pyrophosphate 28 (leavening agent) | 1.80 |
| sodium bicarbonate #2 (leavening agent) | 1.24 |
| corn dextrin | 32.00 |
| sugar (sweetening agent) | 14.00 |
| xanthan gum (stabilizer) | 0.15 |

Method:
1. Obtain non-frosted toaster pastry or other prepackaged toaster pastry product.
2. Spray the toaster pastry with tepid water on both sides to reconstitute the surface to enhance adhesion of the batter—tepid water reconstitutes the surface to act like raw dough.
3. Let the damp toaster pastry sit for a few minutes.
4. Lay the toaster pastry in a pool of clear coat moisture barrier wet slurry of the present invention, stand on its side to drain the excess clear coat moisture barrier wet slurry, place on oil coated foil lined tray. The uncoated weight of the toaster pastry was approximately 54.01 grams. After coating the toaster pastry, the coated weight of the toaster pastry was about 59.74 grams. The calculated percentage of wet slurry pickup was approximately 10.6%.
5. Bake at 350° F. for 15 minutes.

| Prepare Coating Mixture (46% Solids) | |
| --- | --- |
| Dry mix | about 230 g |
| Water | about 270 g |

Add dry batter for one minute on stir speed of mixer, scrape edges, then mix for five minutes on speed #2 of mixer and let rest for 15 minutes.

The percentage of slurry solids in Example 1 was approximately 46.0%. The temperature of the water in the coating mixture was approximately 55° F. and the temperature of the wet slurry was approximately 65° F. The Stein (top to first break in stream of slurry material) viscosity measurements were approximately 14.12 and 13.92 seconds with the Stein average being approximately 14.02 seconds. After the non-frosted toaster pastry was coated with the clear coat moisture barrier wet slurry composition of the present invention, baked, and dried, the clear coat moisture barrier wet slurry coated toaster pastry was reheated in a Sunbeam® brand four slice toaster with the heat/cook setting at 5. Upon removing the coated toaster pastry from the toaster, the toaster pastry outer coating had an invisible appearance and the exterior of the toaster pastry was crisp and tender, while the interior of the toaster pastry remained moist.

EXAMPLE 2

The method of preparing a moisture barrier coated toaster pastry of Example 1 was also employed in this example. The ingredients utilized in the moisture barrier in this example include:

| Formula 2 | |
| --- | --- |
| Ingredient | % Formula |
| Midsol 35 ™ (modified wheat starch component) | 49.31 |
| sodium acid pyrophosphate 28 (leavening agent) | 1.80 |
| sodium bicarbonate #2 (leavening agent) | 1.24 |
| corn dextrin | 32.00 |
| sugar (sweetening agent) | 14.00 |
| xanthan gum (stabilizer) | 0.15 |
| Lecigran 5750 (lecithin) | 1.50 |

The uncoated weight of the toaster pastry was approximately 54.74 grams. After cooling the toaster pastry, the coated weight of the toaster pastry was about 63.59 grams. The calculated percentage of wet slurry pickup was approximately 16.1%.

The percentage of wet batter solids was approximately 46.0%. The temperature of the water in the coating mixture was approximately 55° F. and the temperature of the wet slurry was approximately 70° F. The Stein (top to first break in stream of slurry material) viscosity measurements were approximately 15.21 and 15.19 seconds with the Stein average being approximately 15.20 seconds. After the non-frosted toaster pastry was coated with the clear coat moisture barrier wet slurry composition of the present invention, baked, and dried, the clear coat moisture barrier wet slurry coated toaster pastry was reheated in a Sunbeam® brand four slice toaster with the heat/cook setting at 5. Upon removing the coated toaster pastry from the toaster, the toaster pastry had a crispy outer texture, while the interior of the toaster pastry remained moist.

EXAMPLE 3

The method of preparing a critical moisture barrier coated toaster pastry of Example 1 was also employed in this example. The ingredients utilized in the moisture barrier in this example include:

| Formula 3 | |
| --- | --- |
| Ingredient | % Formula |
| Midsol 35 ™ (modified wheat starch component) | 50.06 |
| sodium acid pyrophosphate 28 (leavening agent) | 1.80 |
| sodium bicarbonate #2 (leavening agent) | 1.24 |
| corn dextrin | 32.00 |
| sugar (sweetening agent) | 14.00 |
| xanthan gum (stabilizer) | 0.15 |
| Lecigran 5750 (lecithin) | 0.75 |

The uncoated weight of the toaster pastry was approximately 56.67 grams. After coating the toaster pastry, the coated weight of the toaster pastry was about 64.20 grams. The calculated percentage of weight slurry pickup was approximately 13.3%.

The percentage of slurry solids was approximately 46.0%. The temperature of the water in the coating mixture was approximately 55° F. and the temperature of the wet slurry was approximately 65° F. The Stein (top to first break in stream of slurry material), viscosity measurements were approximately 13.90, 13.49, and 14.5 seconds with the Stein average being approximately 13.96 seconds. After the non-frosted toaster pastry was coated with the clear coat moisture barrier wet slurry composition of the present invention, baked, and dried, the clear coat moisture barrier wet slurry coated toaster pastry was reheated in a Sunbeam® brand four slice toaster with the heat/cook setting at 5. Upon removing the coated toaster pastry from the toaster, the toaster pastry had a more moist interior than traditional toaster pastries, but did not have as crisp of an exterior as the toaster pastry coated with the Formula 1 moisture barrier coating.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A composition comprising:
A toaster pastry product having a surface at least partially coated with a dried coating composition that is invisible on the toaster pastry product comprising a modified wheat starch and a film forming agent comprising corn dextrin, wherein the dried composition provides at least a partial moisture barrier on the surface of the toaster pastry product, and wherein the toaster pastry product comprises wheat flour, and wherein the modified wheat starch is present in an amount of from 49.31% by weight of the dry ingredients of the coating composition to about 100% by weight of the dry ingredients of the coating composition, and wherein the coating is applied as a slurry and the slurry is coated directly onto the surface of the toaster pastry.

2. The composition of claim 1, wherein the toaster pastry product comprises a low moisture content dough.

3. The composition of claim 2, wherein the slurry is applied to the toaster pastry product at a temperature of from about 40° F. to about 100° F. and the coating composition provides a moisture barrier on the toaster pastry product where the coating composition is applied to the toaster pastry product.

4. The composition of claim 2, wherein the slurry comprises from about 5% to about 46% slurry solids and wherein the modified wheat starch is an oxidized and substituted wheat starch.

5. The composition of claim 4, wherein the slurry comprises from about 30% to about 46% slurry solids and wherein the oxidized and substituted wheat starch is an oxidized and acetylated wheat starch where the substitution level is from 0.01% to about 1% acetylation.

6. The composition of claim 1, wherein the dry ingredients of the coating composition comprise:
from 49.31% to about 100% by weight modified wheat starch;
from about 5% to about 75% by weight film-forming agent;
from about 0% to about 10% by weight leavening system;
from about 0% to about 30% by weight sweetener; and
from about 0% to about 3% by weight stabilizer.

7. The composition of claim 1, wherein the modified wheat starch comprises an oxidized, substituted modified wheat starch and the coating composition comprises from about 32% to about 40% by dry weight corn dextrin.

8. The composition of claim 6, wherein the coating composition comprises from about 32% to about 40% by dry weight corn dextrin.

9. The composition of claim 8, wherein the corn dextrin is less than about 32% soluble in about 77° F. water.

10. The composition of claim 8, wherein the corn dextrin is less than about 15% soluble in about 77° F. water.

11. The composition of claim 6, wherein the leavening system comprises:
from about 0% to about 5% by dry weight sodium acid pyrophosphate; and
from about 0% to about 5% by dry weight sodium bicarbonate.

12. The composition of claim 6, wherein the sweetener comprises granulated sugar.

13. The composition of claim 1, wherein the coating composition further comprises water, thereby forming the slurry and the toaster pastry product has a slurry pickup of from about 5% to about 30% of the slurry on the pastry product after coating.

14. A composition comprising:
a toaster pastry substrate comprising wheat flour and having a surface, wherein the toaster pastry substrate is at least partially coated with a dried coating composition that is invisible on the toaster pastry product, where the dry ingredients of the coating composition comprise:
from 49.31% to about 100% by weight modified wheat starch;
from about 5% to about 75% by weight of a corn dextrin;
from about 0% to about 10% by weight of a leavening system;
from about 0% to about 30% by weight of a sweetener; and
from about 0% to about 3% by weight of a stabilizer; and
wherein the coating composition provides at least a partial moisture barrier on the surface of the toaster pastry substrate upon thermal processing, and wherein the coating is applied as a slurry and the slurry is coated directly onto the surface of the toaster pastry.

15. The composition of claim 14, wherein the modified wheat starch comprises an oxidized, substituted modified wheat starch.

16. The composition of claim 15, wherein the corn dextrin comprises a low-solubility corn dextrin.

17. The composition of claim 14, wherein the leavening system comprises:
from about 0% to about 5% by dry weight sodium acid pyrophosphate; and
from about 0% to about 5% by dry weight sodium bicarbonate.

18. The composition of claim 14, wherein the sweetener comprises granulated sugar.

19. A composition comprising:
a toaster pastry derived at least in part from wheat, having a surface and at least partially coated on the surface with a dried slurry comprising water and a mix of ingredients wherein the slurry is applied directly to the surface of the toaster pastry, and wherein the mix of ingredients comprises modified wheat starch in an amount of from 49.31% to about 60% by weight of the mix of ingredients; corn dextrin in an amount of from about 20% to about 40% by weight of the mix of ingredients; sodium acid pyrophosphate in an amount from about 0.5% to about 2.5% by weight of the mix of ingredients; sodium bicarbonate in an amount of from about 0.5% to about 2.5% by weight of the mix of ingredients; granulated sugar in an amount of from about 10% to about 20% by weight of the mix of ingredients; a stabilizer in an amount of from about 0% to about 3% by weight of the mix of ingredients; wherein the slurry forms at least a partial moisture barrier on the surface of the toaster pastry upon thermal processing that and is invisible.

20. The composition of claim 19, wherein the coating, upon thermal processing, forms a moisture barrier on a portion of the surface of the toaster pastry having the slurry applied and wherein the mix of ingredients comprises from about 32% to about 40% corn dextrin by weight of the mix of ingredients.

21. The composition of claim 20, wherein the stabilizer comprises xanthan gum.

22. The composition of claim 21, wherein the mix of ingredients comprises about 50% by weight modified wheat starch, about 32% by weight corn dextrin, about 1.8% by weight sodium acid pyrophosphate, about 1.2% by weight sodium bicarbonate, about 14% by weight granulated sugar, and about 0.15% by weight xanthan gum.

23. The composition of claim 19, wherein the modified wheat starch comprises an oxidized and substituted wheat starch having a substitution level of about 0.1% and wherein the oxidized and substituted wheat starch comprises an oxidized and acetylated wheat starch.

24. The composition of claim 22, wherein the modified wheat starch comprises an oxidized and substituted wheat starch having a substitution level of about 0.1% and wherein the oxidized and substituted wheat starch comprises an oxidized and acetylated wheat starch.

25. The composition of claim 19, wherein the coating slurry has a viscosity of from about 8 to about 40 seconds as measured by the Stein viscosity method.

26. The composition of claim 24, wherein the coating slurry has a viscosity of from about 8 to about 40 seconds as measured by the Stein viscosity method.

27. The composition of claim 14, wherein the coating composition provides a moisture barrier where the coating composition has been applied to the surface of the pastry substrate and wherein the corn dextrin is present in an amount of from about 32% to about 40% by dry weight.

28. The composition of claim 27, wherein the modified wheat starch comprises an oxidized, substituted wheat starch.

29. The composition of claim 28, wherein the corn dextrin comprises a low-solubility corn dextrin.

30. The composition of claim 19, wherein the stabilizer comprises xanthan gum.

31. The composition of claim 30, wherein the modified wheat starch comprises an oxidized and substituted wheat starch having a substitution level of about 0.1% and wherein the oxidized and substituted wheat starch is an oxidized and acetylated wheat starch.

* * * * *

UNITED STATES PATENT AND TRADEMARK OFFICE
CERTIFICATE OF CORRECTION

| | | |
|---|---|---|
| PATENT NO. | : 8,048,459 B2 | Page 1 of 1 |
| APPLICATION NO. | : 10/629991 | |
| DATED | : November 1, 2011 | |
| INVENTOR(S) | : Cheree L. B. Stevens et al. | |

It is certified that error appears in the above-identified patent and that said Letters Patent is hereby corrected as shown below:

In the Claims:
Col. 10, claim 19, line 19;
"processing that and" should be -- processing and --.

Signed and Sealed this
Twenty-eighth Day of January, 2014

Michelle K. Lee
*Deputy Director of the United States Patent and Trademark Office*